United States Patent
Rohde

(10) Patent No.: US 8,600,232 B2
(45) Date of Patent: Dec. 3, 2013

(54) METHOD AND DEVICE FOR DATA PROCESSING IN AN OPTICAL NETWORK AND COMMUNICATION SYSTEM

(75) Inventor: Harald Rohde, München (DE)

(73) Assignee: Nokia Siemens Networks Oy, Espoo (FI)

( * ) Notice: Subject to any disclaimer, the term of this patent is extended or adjusted under 35 U.S.C. 154(b) by 549 days.

(21) Appl. No.: 12/812,998

(22) PCT Filed: Jan. 8, 2009

(86) PCT No.: PCT/EP2009/050169
§ 371 (c)(1),
(2), (4) Date: Nov. 16, 2010

(87) PCT Pub. No.: WO2009/090136
PCT Pub. Date: Jul. 23, 2009

(65) Prior Publication Data
US 2011/0044687 A1    Feb. 24, 2011

(30) Foreign Application Priority Data
Jan. 15, 2008   (EP) ..................... 08000697

(51) Int. Cl.
*H04B 10/20* (2011.01)
(52) U.S. Cl.
USPC .................. 398/58; 398/63; 398/66; 398/67; 398/100
(58) Field of Classification Search
None
See application file for complete search history.

(56) References Cited

U.S. PATENT DOCUMENTS

| | | | |
|---|---|---|---|
| 7,031,343 B1* | 4/2006 | Kuo et al. | 370/473 |
| 7,639,905 B2 | 12/2009 | Ikeda et al. | |
| 2003/0179769 A1* | 9/2003 | Shi et al. | 370/442 |
| 2007/0055988 A1 | 3/2007 | Iwamura | |
| 2007/0230956 A1* | 10/2007 | Ikeda et al. | 398/71 |
| 2007/0274717 A1* | 11/2007 | Xu et al. | 398/58 |

FOREIGN PATENT DOCUMENTS

| | | |
|---|---|---|
| CN | 1878302 A | 12/2006 |
| CN | 101048008 A | 10/2007 |

OTHER PUBLICATIONS

ITU-T G.984.3: "Gigabit-Capable Passive Optical Networks (G-PON): Transmission Convergence Layer Specification", International Telecommunication Union, Mar. 2008.*
ITU-T G 983.1 Telecommunication Standardization Sector of ITU: Broadband Optical Access Systems Based on Passive Optical Networks (PON), Jan. 2005.
"Gigabit-Capable Passive Optical Networks (G-PON): Transmission Convergence Layer Specification; G.984.3 (02/04)" ITU-T Standard in Force (I), International Telecommunication Union, Geneva, CH, No. G.984.3 (02/04), February 22, 2004, XP017401196.

* cited by examiner

*Primary Examiner* — Li Liu
(74) *Attorney, Agent, or Firm* — Laurence A. Greenberg; Werner H. Stemer; Ralph E. Locher

(57) ABSTRACT

A method and a device process data in an optical network. At least one dedicated time slot is used for transmitting time critical information from an optical network unit towards an optical line terminal. Due to the dedicated time slot, previous long delays in channel switching are decreased or substantially avoided.

9 Claims, 1 Drawing Sheet

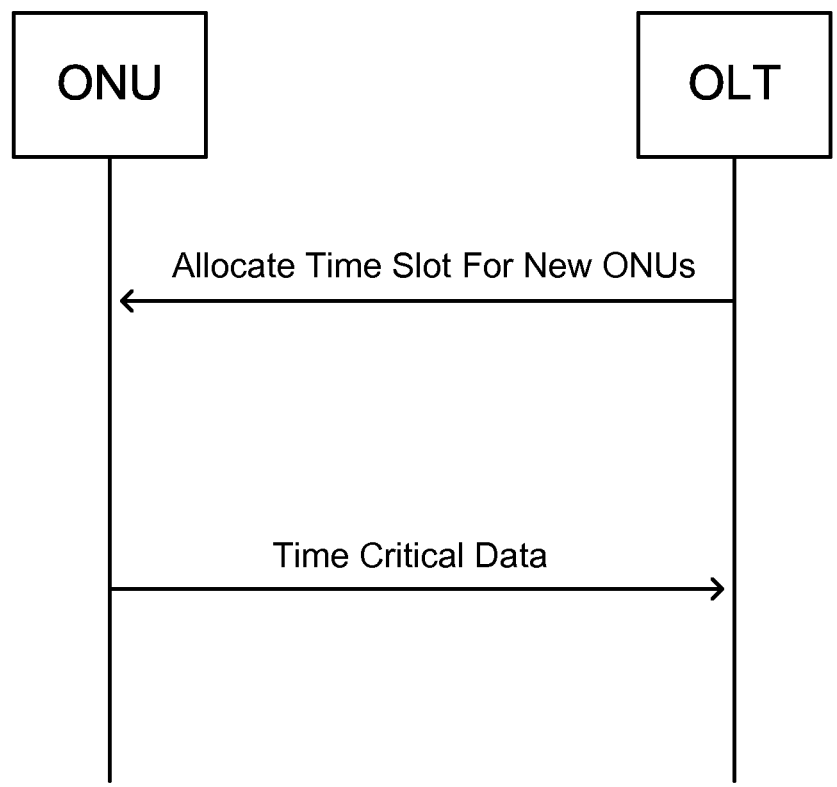

METHOD AND DEVICE FOR DATA PROCESSING IN AN OPTICAL NETWORK AND COMMUNICATION SYSTEM

BACKGROUND OF THE INVENTION

Field of the Invention

The invention relates to a method and to a device for data processing in an optical network and to a communication system comprising such a device.

Fibre to the Home (FTTH) deployment is gaining momentum and is increasingly deployed. Together with different Fibre to the Curb, Premises, Home etc. (FTTx) technologies, usually TV services are bundled with the bit stream offered.

In addition, long reach, long range, high speed Passive Optical Networks (PONs) with a large splitting factor are under development to significantly change future network architectures.

Digital TV, e.g., different digital video broadcasting (DVB) variants, Internet protocol television (IPTV) on demand, suffers from lasting channel switching times amounting to ca. 1 to 5 seconds. Such delay significantly reduces the quality of a user's experience, because with each channel change s/he has to wait a significant amount of time for the subsequent channel to appear.

There is even an idea to show a commercial when the user switches from one channel to another. However, such approach would be hardly deemed acceptable to the user.

BRIEF SUMMARY OF THE INVENTION

The problem to be solved is to overcome the disadvantage of long delay when switching channels.

This problem is solved according to the features of the independent claims. Further embodiments result from the depending claims.

In order to overcome this problem, a method for data processing in an optical network is provided, wherein at least one dedicated time slot is used for transmitting time critical information from an Optical Network Unit towards an Optical Line Terminal.

In an embodiment, said at least one dedicated time slot comprises a time slot allocated by the Optical Line Terminal for new Optical Network Units to convey data.

In another embodiment, said at least one dedicated time slot is a ranging timeslot according to ITU-T Recommendation G.984.3 (see in particular Section 10, "PLOAM Messages and Flag Field").

In a further embodiment, the frequency of the dedicated time slot is adjusted.

In a next embodiment, time critical information comprises a user's request to change a channel.

It is also an embodiment that the user is connected to an IPTV application via the optical network.

The problem stated above is also solved by a device for data processing comprising a processor unit and/or a hard-wired circuit (e.g., an ASIC or an FPGA) that is equipped and/or arranged such that the method as described herein is executable thereon.

According to an embodiment, the device is a communication device, in particular a set-top-box or any device associated with or comprising an IPTV terminal functionality.

The problem stated supra is further solved by a communication system comprising the device as described herein.

Embodiments of the invention are shown and illustrated in the following figure:

BRIEF DESCRIPTION OF THE DRAWING

FIG. 1 shows a message chart comprising an Optical Network Unit and an Optical Line Terminal, wherein the Optical Network Unit utilizes at least one time slot for allocated by the Optical Line Terminal for new Optical Network Units to convey time critical data.

DESCRIPTION OF THE INVENTION

There are several steps to be processed in order to switch from one IPTV channel to another. One step is the transmission of the switching request from the user to the video server.

If the user is connected with a Passive Optical Network (PON), such a request is transmitted as follows (details can be found in the ITU-T Recommendations G.983.X-G.984.X): The Optical Line Terminal (OLT), the network element connected to the backbone (or metro) section of the network, polls each Optical Network Unit (ONU), which corresponds to the network element at the user side, 8000 times a second. This frequency is provided by a frame clock of the underlying backbone Synchronous Digital Hierarchy (SDH) network.

If an Optical Network Unit (ONU) wants to transmit data, it answers with a request to send data. The OLT then assigns a time slot for the respective ONU in which the ONU is allowed to transmit its data, e.g., a user's request to change a channel (see FIG. 1).

If the ONU has additional data to transmit, this user's change request may be stored in a queue to be transmitted after some time, depending of the priority of the request.

Upcoming long reach PONs will have a splitting factor of up to 1024 and a reach of up to 100 km. In case of a fully equipped PON with all ONUs active (e.g., during a popular sports event), each ONU is polled every 1024 s/8000=128 ms. In such a scenario, the complete signaling of a simple change request from an ONU to the OLT alone could aggregate to several 100s of milliseconds.

The approach provided allows to significantly shorten the time to process a user's request to change a channel.

A newly attached or switched ONU is detected in the PON according to the following mechanism: On a more or less regular basis, the OLT allocates a time slot in which all new ONUS are allowed to send. A new ONU announces its existence within this time slot and it gets integrated into the PON according to a protocol as defined in G.984.3, "Gigabit-capable Passive Optical Networks (G-PON): Transmission convergence layer specification".

The approach provided herein allows utilization of this time slot dedicated for the discovery of new ONUS also for the transmission of time critical data packets that are preferably small in size and/or infrequently to be sent.

The frequency of this time slot can be enhanced to be available, e.g., from once every polling cycle to several times every polling every cycle.

Any change request from an arbitrary ONU will then be sent during this time slot, avoiding long negotiations about available time slots. The time for the transmission of a change request or other time critical short data packets can be reduced from several 100s of milliseconds to a few 10s of milliseconds or even below 10 ms.

If by chance two ONUS use the same time slot for their transmission, this collision can be detected by the OLT and reassigned by means of the transmission protocol. In such a case, the switching may required some additional 100s of milliseconds. However, such collision is deemed a rather rare event.

An implementation of the approach may comprise an adjustment of the PON protocol. Hence, the time slots described may be assigned more frequently, e.g., 10 times per second, and a new type of upstream message can be provided that may be sent during this discovery time slots.

Abbreviations:
DVB Digital Video Broadcasting
IPTV Internet Protocol Television
OAM Operation, Admission, Maintenance
OLT Optical Line Terminal
ONU Optical Network Unit
PLOAM Physical Layer OAM
PON Passive Optical Network
SDH Synchronous Digital Hierarchy

The invention claimed is:

1. A method for data processing in an optical network, which comprises the step of:
 transmitting IPTV channel switching requests from an optical network unit towards an optical line terminal using a ranging time slot.

2. The method according to claim 1, wherein the ranging time slot is a ranging timeslot according to ITU-T Recommendation G.984.3.

3. The method according to claim 1, which further comprises adjusting a frequency of the ranging time slot.

4. A device for data processing, the device comprising:
 a processor unit; and
 a hard-wired circuit programmed to transmit IPTV channel switching requests from an optical network unit towards an optical line terminal using at least one ranging time slot.

5. The device according to claim 4, wherein the device is a communication device.

6. The device according to claim 4, further comprising an IPTV terminal functionality.

7. The device according to claim 4, wherein the device is a set-top-box.

8. A device for data processing, the device comprising:
 a processor unit programmed to transmit IPTV channel switching requests from an optical network unit towards an optical line terminal using at least one ranging time slot.

9. A communication system, comprising:
 a device for data processing containing a processor unit and a hard-wired circuit programmed to transmit IPTV channel switching requests from an optical network unit towards an optical line terminal using at least one ranging time slot.

* * * * *